(12) United States Patent
Cheng

(10) Patent No.: US 8,159,171 B2
(45) Date of Patent: Apr. 17, 2012

(54) CONTROLLER AND METHOD FOR ADAPTIVELY ADJUSTING MOTOR DRIVING CURRENT WAVEFORMS

(75) Inventor: Mao-Hsin Cheng, Zhubei (TW)

(73) Assignee: Padauk Technology Co., Ltd., R.O.C., Hsin-Chu (TW)

( * ) Notice: Subject to any disclaimer, the term of this patent is extended or adjusted under 35 U.S.C. 154(b) by 727 days.

(21) Appl. No.: 12/270,765

(22) Filed: Nov. 13, 2008

(65) Prior Publication Data

US 2010/0117573 A1    May 13, 2010

(51) Int. Cl.
*G05B 11/28*    (2006.01)

(52) U.S. Cl. ............... 318/599; 318/400.1; 318/400.13; 318/799

(58) Field of Classification Search ............. 318/400.01, 318/599, 811, 701, 721, 779, 799, 400.38, 318/280, 400.1, 400.07, 400.13, 400.14; 388/819, 823, 831
See application file for complete search history.

(56) References Cited

U.S. PATENT DOCUMENTS

| | | | | |
|---|---|---|---|---|
| 5,173,651 | A * | 12/1992 | Buckley et al. | 318/701 |
| 7,259,531 | B1 * | 8/2007 | Liu | 318/400.38 |
| 7,447,449 | B2 * | 11/2008 | Lu et al. | 399/34 |
| 7,626,350 | B2 * | 12/2009 | Mori et al. | 318/432 |

* cited by examiner

*Primary Examiner* — Walter Benson
*Assistant Examiner* — Antony M Paul
(74) *Attorney, Agent, or Firm* — Tung & Associates

(57) ABSTRACT

The present invention discloses a controller and a method for adaptively adjusting motor driving current waveforms. According to the present invention, the controller receives multiple different control parameters which may be determined according to the characteristics of a fan to be controlled, and adjusts the delayed ON time and advanced OFF time of a PWM driving signal based on the control parameters and the present rotation speed of the fan motor, so that the fan operates under an optimum driving current waveform.

18 Claims, 8 Drawing Sheets

CONTROLLER AND METHOD FOR ADAPTIVELY ADJUSTING MOTOR DRIVING CURRENT WAVEFORMS

BACKGROUND OF THE INVENTION

1. Field of the Invention

The present invention relates to a controller and a method for adaptively adjusting motor driving current waveforms.

2. Description of the Related Art

A common application for motors is to drive a fan. In driving a fan, the driving current waveform of the motor will affect the stability, noise and efficiency of the fan. Typically, a HALL sensor is used in the fan control system; the HALL sensor outputs a HALL signal, based on which a PWM driving signal is generated to control a motor driver circuit, and the latter controls the operation of the motor in response to the PWM driving signal.

Conventionally, when the motor driving current waveform is not good such that the fan has a low operation efficiency, there are two methods to solve the issue. In the first method, the physical location of the HALL sensor is fine-tuned to adjust the control signal of the driver circuit. In the second method, the PWM driving signal is adjusted by hardware circuitry so that the motor driving current waveform is tuned better.

Referring to FIG. 1, in the first method, the level switching points of the PWM driving signal exactly follow the rising and falling edges of the HALL signal (as shown in the figure, the rising edge P1 and falling edge P2 of the PWM driving signal are at the same time as the rising edge H1 and falling edge H2 of the HALL signal). Therefore, this method requires adjusting the physical location of the HALL sensor so as to change the level switching points of the PWM driving signal. However, different fans have different characteristics; this method has to fine-tune the location for every different fan, which is time-consuming and cost-ineffective. Moreover, in this method, the location of the HALL sensor is decided according to the motor driving current waveform when the motor is in full speed operation, but when the fan operates in low speed, the current will be too high and the operation efficiency is low.

Referring to FIG. 2 which is a figure cited from U.S. Pat. No. 7,030,584, in the second method, the PWM driving signal is adjusted by hardware circuitry. In this prior art, the turned-OFF time of the PWM driving signal is pulled in (advanced OFF time) to generate the signal 44 shown in the figure. However, such arrangement is not good enough to completely solve the issue of bad motor driving current waveform. Referring to FIG. 3, when a PWM driving signal is generated according to the positive and negative cycles of a HALL signal, and the PWM driving signal is turned OFF early, an imbalance occurs in the motor driving current waveform (shown by the references C1 and C2). Moreover, for a different fan, the hardware circuitry needs to be modified correspondingly, and such modification is time-consuming and cost-ineffective.

In addition to the foregoing drawbacks, when different HALL signals result in different motor driving current waveforms (such as the imbalance in the motor driving current waveform described above, or different motor driving current waveforms caused by different fans), because the location of the HALL sensor or the switching mode in the circuitry of the driver circuit is fixed, the switching points of the driver circuit can not adaptively change in response to different HALL signals. Unless the hardware is modified, the instable fan operation due to imbalanced motor driving current waveform can not be improved.

SUMMARY OF THE INVENTION

In view of the foregoing, a first objective of the present invention is to provide a controller capable of adaptively adjusting motor driving current waveforms, to improve the drawbacks in the prior art.

A second objective of the present invention is to provide a control method for adaptively adjusting motor driving current waveforms.

To achieve the foregoing objectives, in one aspect, the present invention discloses a controller for adaptively adjusting motor driving current waveforms, the controller supplying a PWM driving signal to a driver circuit, the controller comprising: a motor speed/period detection unit receiving a signal relating to a motor and detecting the speed and period of the motor; a PWM signal advance/delay calculation unit receiving a plurality of parameters and an output from the motor speed/period detection unit, and determining an advanced OFF time and a delay ON time of the PWM driving signal; and a PWM signal generation unit generating the PWM driving signal according to an output from the PWM signal advance/delay calculation unit, wherein the PWM signal advance/delay calculation unit is firmware.

In another aspect, the present invention discloses a method for adaptively adjusting motor driving current waveforms for use in a controller, the controller supplying a PWM driving signal to a driver circuit, the method comprising: receiving a signal relating to a motor and detecting the speed and period of the motor according to the signal; receiving a plurality of parameters and the speed and period of the motor, and determining an advanced OFF time and a delay ON time of the PWM driving signal; and generating the PWM driving signal.

In the aforementioned controller and method, in one embodiment, the signal relating to a motor is a HALL signal, and the PWM driving signal is turned ON later than a level switching point of the HALL signal, but turned OFF earlier than a next level switching point of the HALL signal. The delayed ON time and the advance OFF time of the PWM driving signal are preferably determined by one of the parameters, the period of the HALL signal, and the maximum speed of the motor.

In one embodiment, the PWM driving signal includes four PWM signals and the driver circuit includes four transistors each of which has a gate controlled by a corresponding one of the PWM signals. Preferably, the four transistors are electrically connected in series two by two in two pairs, the series connection node between each pair of transistors connected in series being electrically connected to an end of the motor, and the other ends of the transistors which are not connected with the other transistor in the series connection pair being electrically connected to a supply voltage and ground, respectively; wherein the four PWM signals control the gates of the four transistors such that in a time period, both of the transistors electrically connected to the supply voltage are OFF and both of the transistors electrically connected to ground are ON.

For better understanding the objectives, characteristics, and effects of the present invention, the present invention will be described below in detail by illustrative embodiments with reference to the attached drawings.

DESCRIPTION OF THE PREFERRED EMBODIMENT

Figure 1:
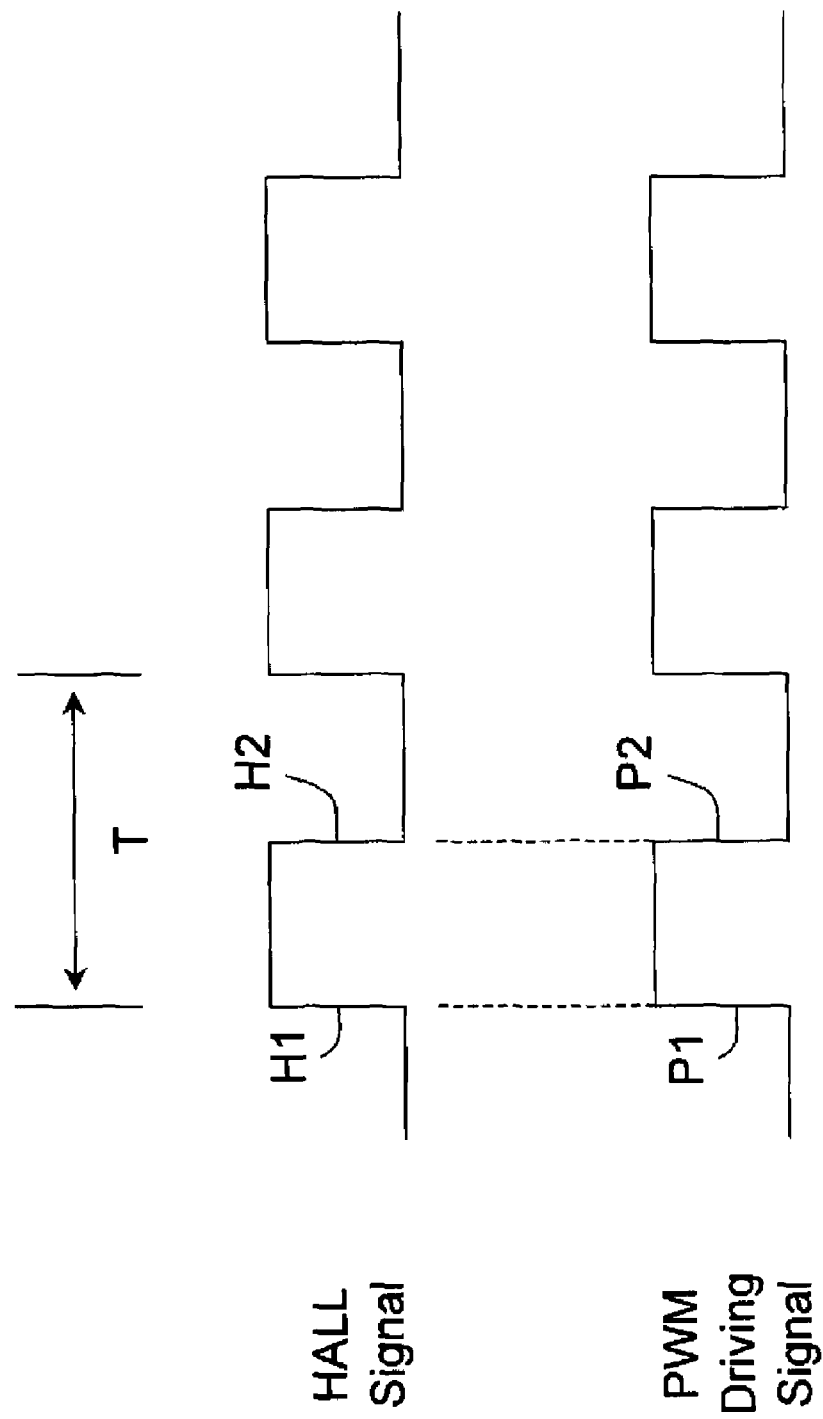
FIGS. 1 and 2 schematically show two conventional methods for adjusting the motor driving current waveforms.
Figure 2:
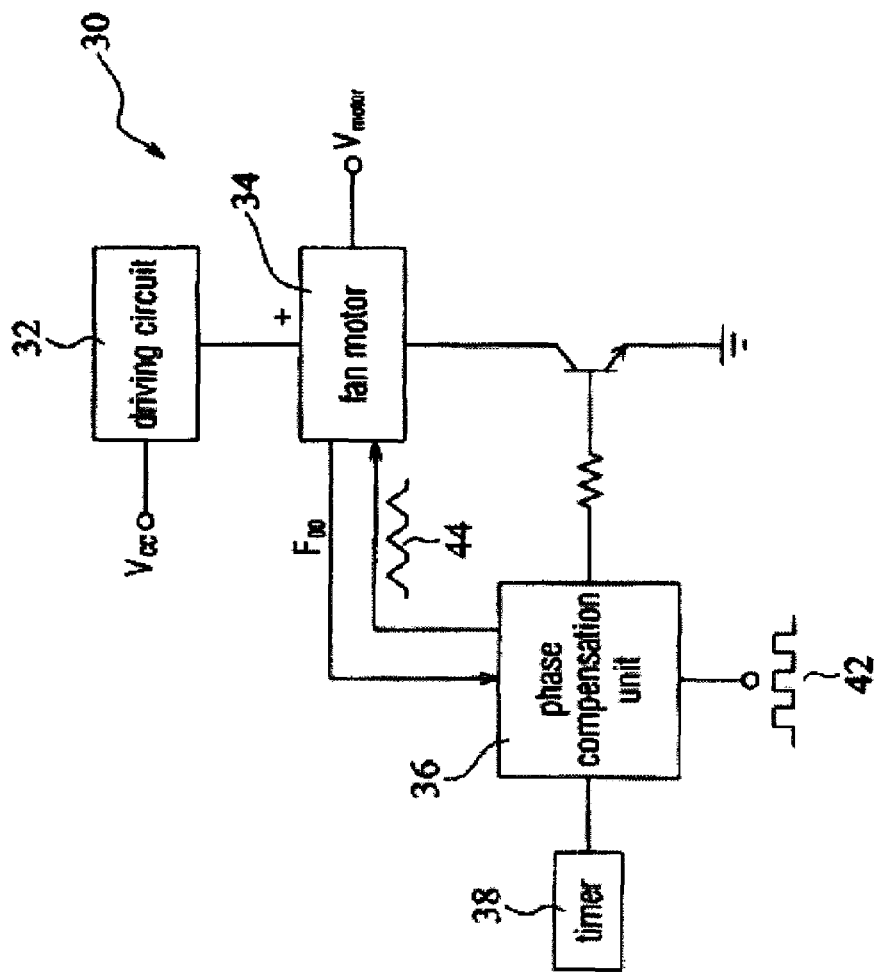
Figure 3:
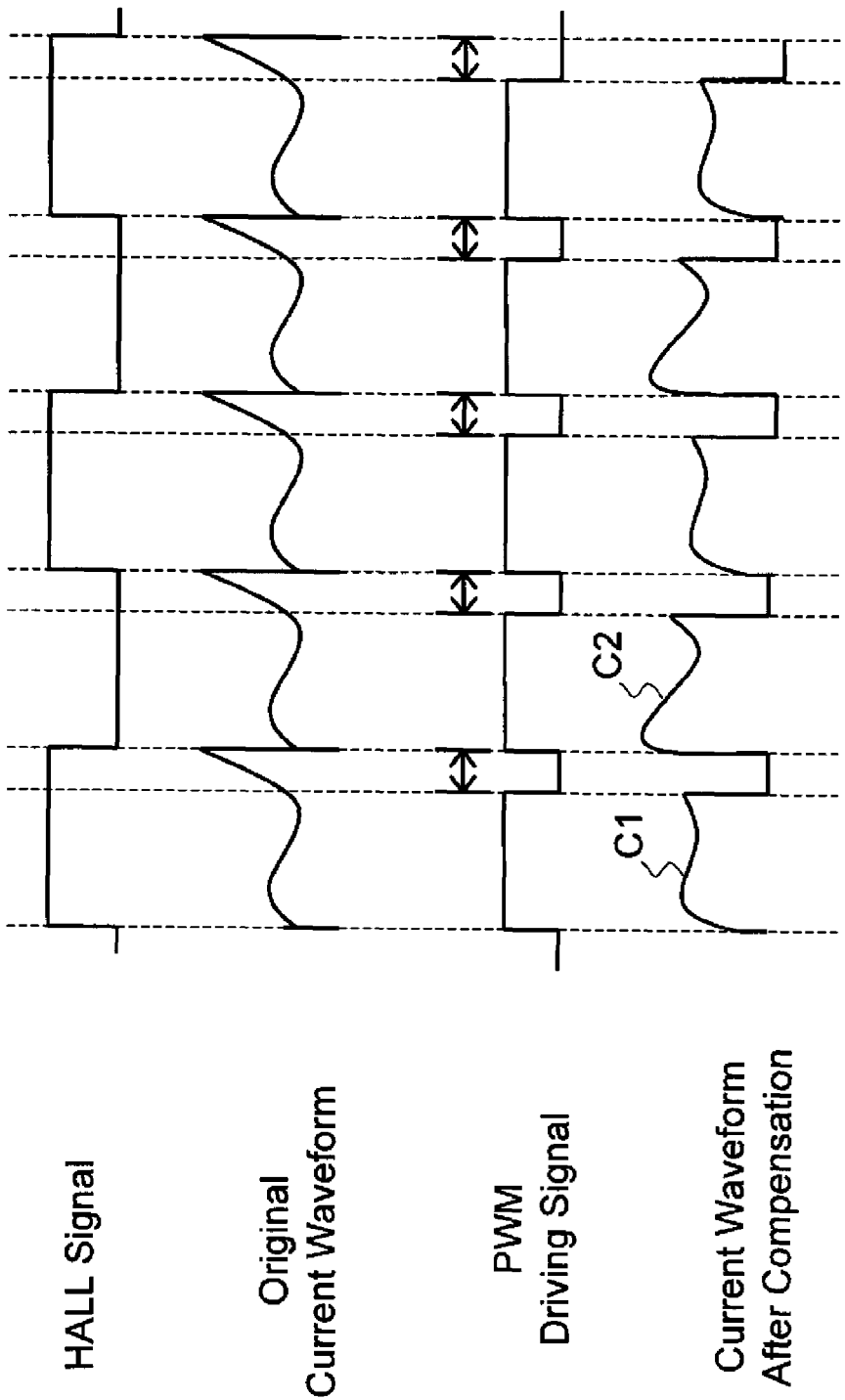
FIG. 3 explains the problem in the prior art.
Figure 4:
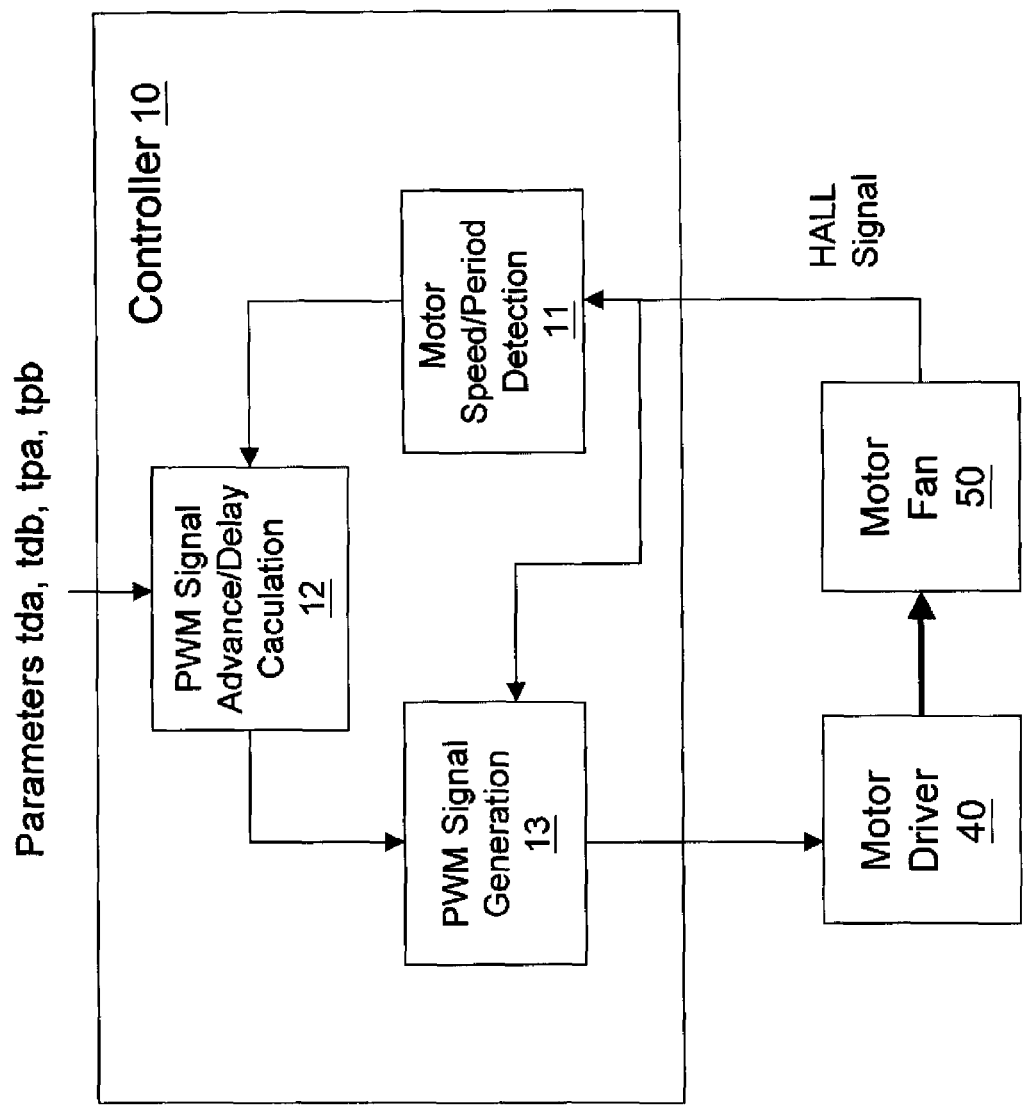
FIG. 4 schematically shows a controller capable of adaptively adjusting motor driving current waveforms according to an embodiment of the present invention.

Referring to FIG. 4, In an embodiment of the present invention, the controller 10 capable of adaptively adjusting motor driving current waveforms controls a motor driver circuit 40; the motor driver circuit 40 drives a motor such as a fan motor 50, but can be other motors as well. The motor generates a HALL signal and feedbacks the signal to the controller 10. The controller 10 includes a motor speed/period detection unit 11, a PWM signal advance/delay calculation unit 12, and a PWM signal generation unit 13. The motor speed/period detection unit 11 calculates the speed and period of the motor based on the HALL signal. The PWM signal advance/delay calculation unit 12 calculates an advanced OFF time and a delayed ON time of the PWM driving signal according to the calculation of the motor speed/period detection unit 11 and parameters tda, tdb, tpa, and tpb inputted externally (to be explained later). The PWM signal generation unit 13 adjusts the PWM driving signal that it provides to the motor driver circuit 40 according to the HALL signal and the output from the PWM signal advance/delay calculation unit 12. Note that in a preferred embodiment, the motor speed/period detection unit 11 and the PWM signal advance/delay calculation unit 12 are a firmware program in the controller 10 instead of hardware circuits. Thus, different control parameters can be inputted to the controller 10 according to different characteristics of different fans, and the controller 10 can flexibly adjust the advanced OFF time and the delayed ON time of the PWM driving signal according to the parameters, the present rotation speed of the fan, and the HALL signal, so that the fan operates in the optimum condition. Such benefit will be explained in detail later.

Figure 5:
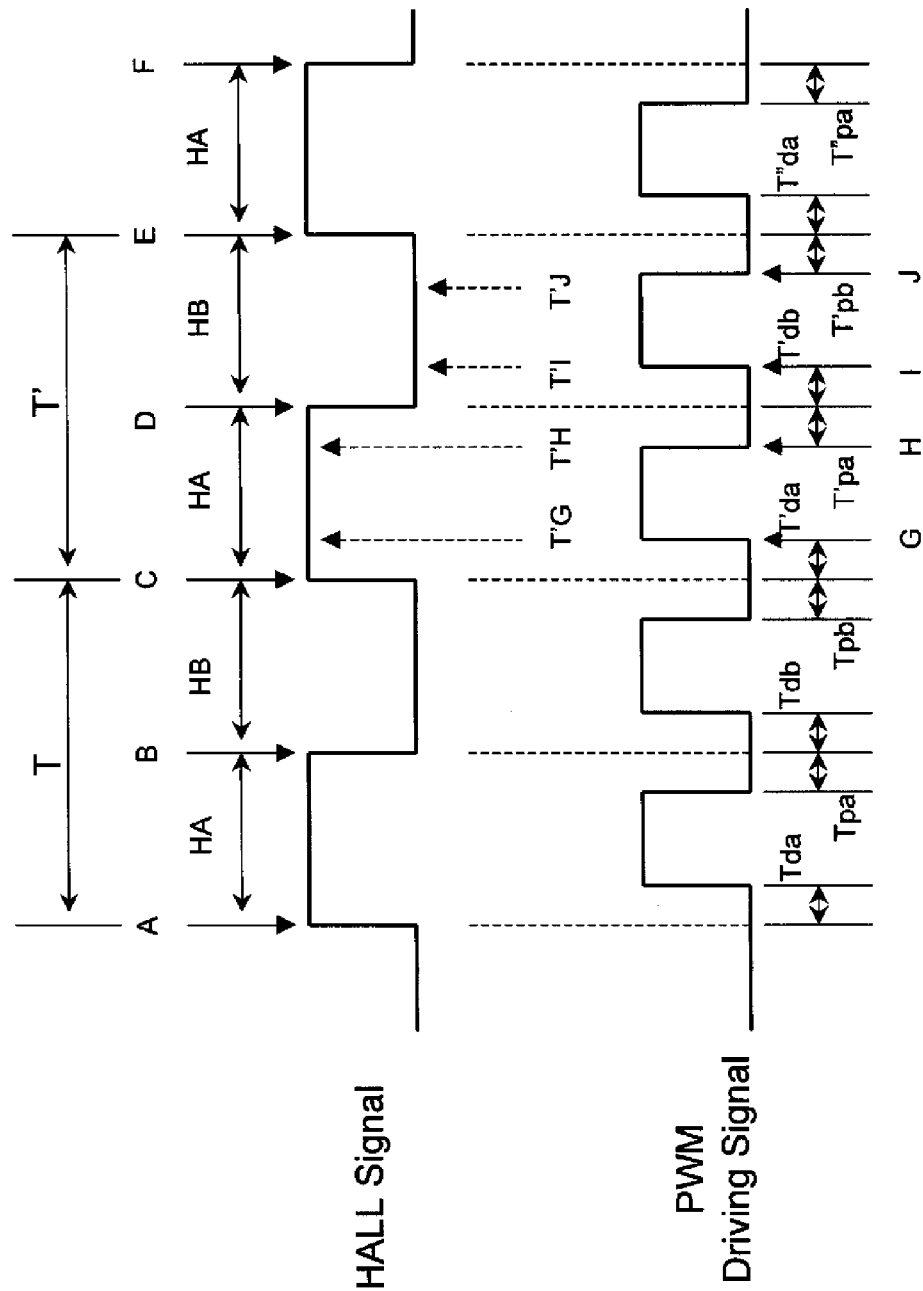
FIG. 5 explains how the PWM driving signal is generated according to the HALL signal and the control parameters.

Referring to FIG. 5, in the present invention, both the starting point of the OFF time and the starting point of the ON time of the PWM driving signal are adjustable, to advance the turned-OFF time and to delay the turned-ON time. In the figure, the high level of the HALL signal is represented by HA and the low level of the HALL signal is represented by HB. When the HALL signal switches from HB to HA, the advanced OFF time in the PWM driving signal corresponding to such switching from HB to HA is denoted by the sub-note pb, and the delayed ON time is denoted by the sub-note da; when the HALL signal switches from HA to HB, the advanced OFF time in the PWM driving signal corresponding to such switching from HA to HB is denoted by the sub-note pa, and the delayed ON time is denoted by the sub-note db. That is, in the first period T including HA and HB, the turned-ON time of the PWM driving signal is delayed by Tda; the turned-OFF time is advanced by Tpa; the turned-ON time is delayed by Tdb; and the turned-OFF time is advanced by Tpb. In the second period T', the turned-ON time of the PWM driving signal is delayed by T'da; the turned-OFF time is advanced by T'pa; the turned-ON time is delayed by T'db; and the turned-OFF time is advanced by T'pb. The rest of the PWM driving signal is similar.

In the second period T' of the HALL signal, the motor speed/period detection unit 11 of the controller 10 obtains the information of the previous period T; the PWM signal advance/delay calculation unit 12 calculates the required advance and delay time T'da, T'pa, T'db and T'pb according to the given advance parameters (tpa and tpb) and delay parameters (tda and tdb) and the length of the previous period T, and further calculates the switching time T'G, T'H, T'I and T'J corresponding to the level switching points G, H, I and J. In one embodiment, such calculation can follow the equations below:

$T'da = tda$ $T'pa = tpa$ $T'db = tdb$ $T'pb = tpb$ $T'G = T'da$ $T'H = T/2 - T'pa$ $T'I = T/2 + T'db$ $T'J = T - T'pb$ Based on the switching time T'G, T'H, T'I and T'J calculated as above, and the present period information of the HALL signal obtained from the motor speed/period detection unit 11, the PWM signal generation unit 13 switches the PWM driving signal at proper timings; the PWM driving signal is supplied to the motor driver circuit 40 to drive the fan motor 50.

In another embodiment, the numbers of T'da, T'pa, T'db and T'pb can be adjusted according to the motor speed to improve the efficiency of the fan, in particular in low motor speed condition when the motor current is too high. Assuming that the maximum speed of a subject fan corresponding to a fully-ON PWM driving signal is rpmLMT; the delay/advance parameters are tda, tdb, tpa and tpb, respectively; and the previous HALL signal period is T, then the equations can be modified as:

$T'da = tda/(rpmLMT*T)$ $T'pa = tpa/(rpmLMT*T)$ $T'db = tdb/(rpmLMT*T)$ $T'pb = tpb/(rpmLMT*T)$ $T'G = T'da$ $T'H = T/2 - T'pa$ $T'I = T/2 + T'db$ $T'J = T - T'pb$ Thus, in the present invention, when different motor driving current waveforms occur due to different HALL signals (such as an imbalanced motor driving current waveform), the delay/advance parameters tda, tdb, tpa and tpb can be modified to optimize the motor driving current waveform without modifying the hardware circuitry.

Figure 6:
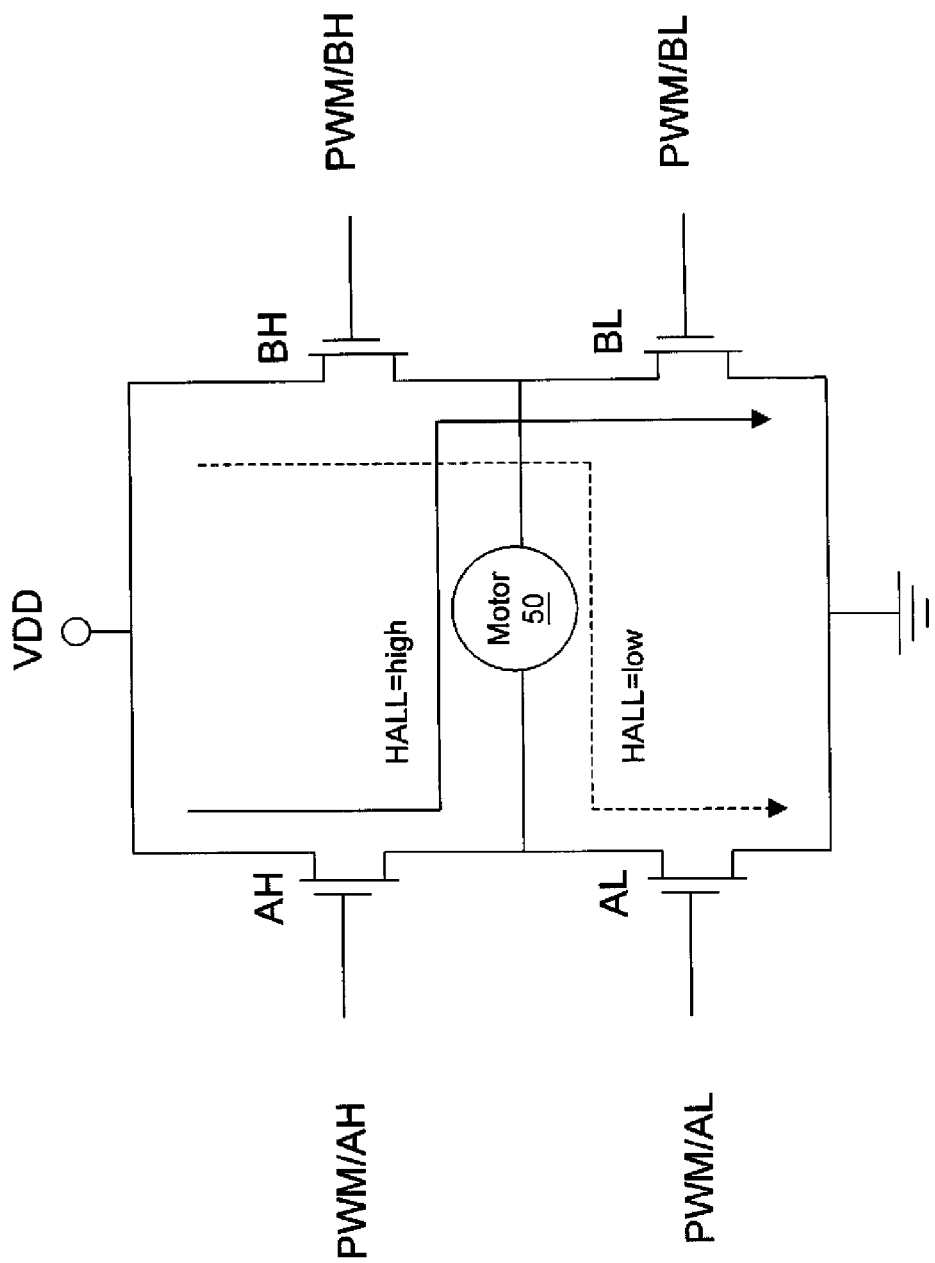
FIG. 6 shows, by way of example, a driver circuit 40 that can be controlled by the present invention.

Referring to FIG. 6 which shows an application that the controller 10 can be applied to, i.e., a driver circuit 40 controlled by the controller 10. The driver circuit 40 includes four transistors AH, AL, BH and BL connected in series two by two in two pairs. The series connection node between a pair of series-connected transistors is connected to one end of a fan motor 50; the other ends of the transistors which are not connected with the other transistor in the series connection pair are connected to a supply voltage VDD and ground, respectively. The controller 10 outputs four PWM signals PWM/AH, PWM/AL, PWM/BH and PWM/BL, controlling the gates of the transistors AH, AL, BH and BL respectively (that is, the PWM driving signal includes four PWM signals in this case). The operation is thus: alternating the direction of the fan motor current according to the HALL signal, to turn ON the transistors AH and BL when the HALL signal is high, and to turn ON the transistors BH and AL when the HALL signal is low.

Figure 7:
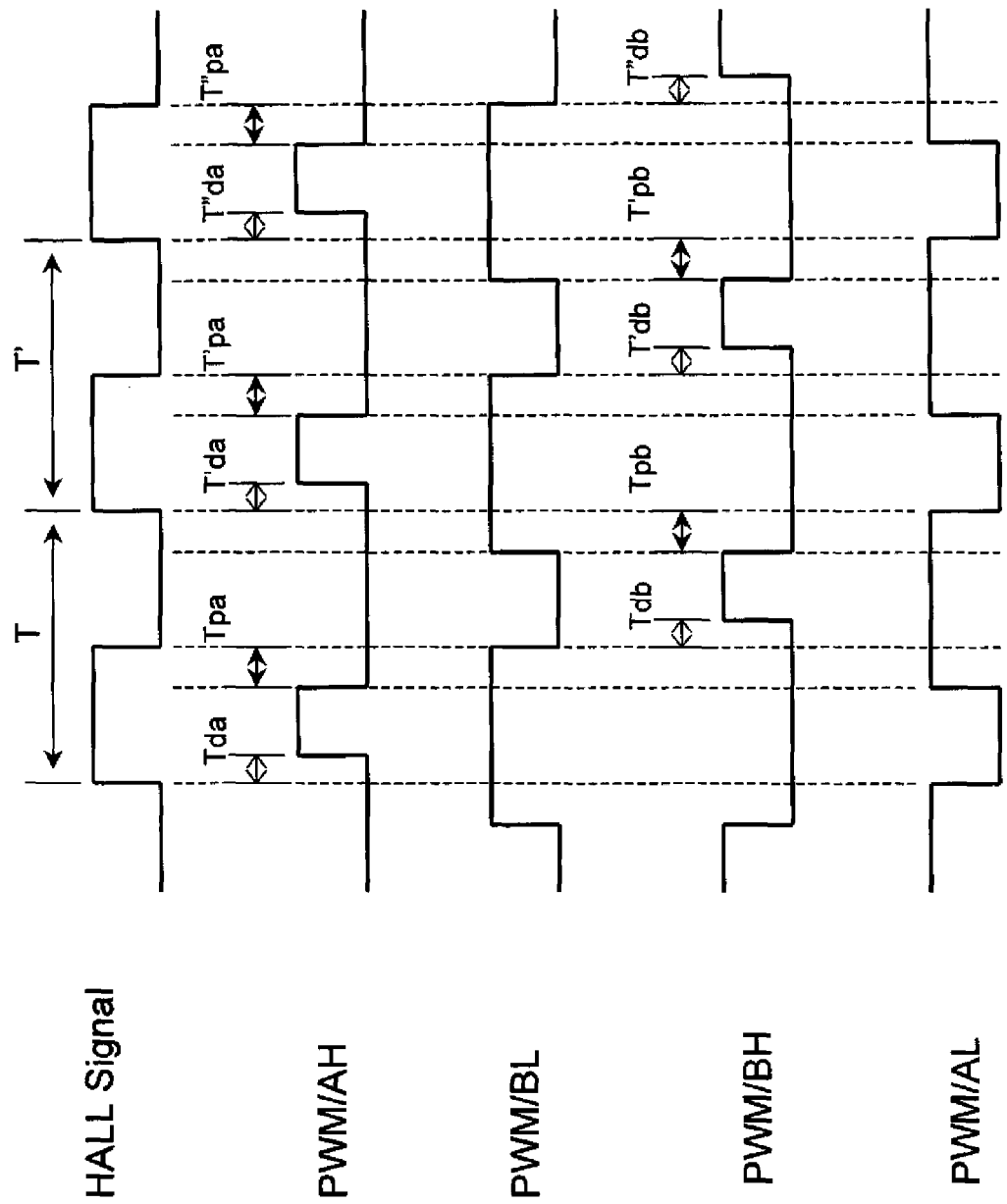
FIG. 7 shows the waveforms of the PWM signals for controlling the driver circuit 40.

An example of the waveforms of the PWM signals in FIG. 6 is shown in FIG. 7. As shown in the figure, in the time periods Tpa, Tpb, T'pa, T'pb, T"pa and T"pb, the signals PWM/AH and PWM/BH are both low, and PWM/AL and PWM/BL are both high; thus, the upper gates (transistors AH and BH) of the driver circuit 40 in FIG. 6 are both OFF and the lower gates (transistors AL and BL) of the driver circuit 40 are both ON, so that the back electromotive force generated during fan operation can be effectively released by the full conduction of the lower gates of the driver circuit 40, and no voltage is added to the supply voltage to create a surge.

Figure 8:
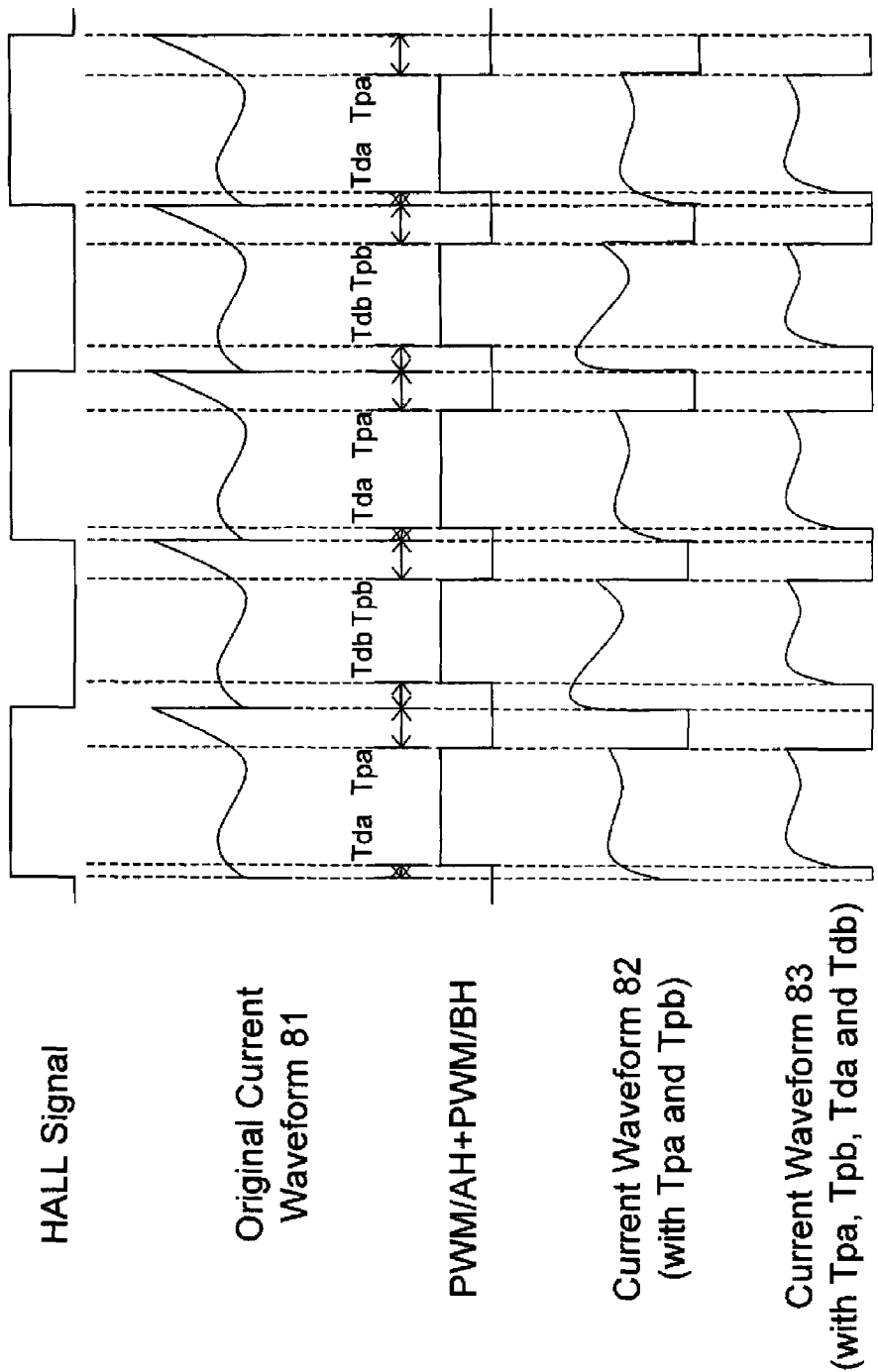
FIG. 8 shows the effect of the present invention.

FIG. 8 shows motor driving current waveforms, including a waveform corresponding to the PWM signals shown in FIG. 7. When the original current waveform 81 has high surge waves, the issue can be solved by properly setting rpmLMT and advance parameters tpa and tpb. If the current waveform 82 after correction is imbalanced, the motor current can be adjusted by properly setting the delay parameters tda and tdb, to optimize the waveform (83). Of course, if the current waveform 82 is already good enough, the parameters tda and tdb can be set equal to each other. The adjustment can be performed dynamically and efficiently by a computer program during motor operation, and the final number of the parameters can then be set into the controller 10, so that the fan always operates under the optimum motor driving current waveform.

And if the original current waveform 81 does not have surge waves as the ones shown in FIG. 8, the parameters tpa and tpb can be set to 0, shutting down the advance-OFF function in the PWM driving signal. In other words, the controller 10 of the present invention can be adaptively adjusted in correspondence to various environmental conditions such as the physical location of the HALL sensor and the characteristics of the fan; the parameters rpmLMT, tpa, tpb, tda and tdb can be dynamically and effectively set to optimize the motor driving current waveform, without modifying the location of the HALL sensor and the hardware circuitry.

In summary, in comparison with prior art, the present invention has at least the following advantages: (1) it is more flexible because it can be readily applied to any application environment, by changing the settings of the parameters without requiring modification of hardware circuitry; (2) the imbalance in the motor driving current waveform is solved.

The features, characteristics and effects of the present invention have been described with reference to its preferred embodiments, which are provided only for illustrative purpose and not for limitation of the scope. Various other substitutions and modifications will occur to one skilled in the art, without departing from the spirit of the present invention. For example, the present invention can be applied to any motor system, not only the fan motors. As another example, the transistors shown in FIG. 6 can be NMOS or PMOS FETs, or PNP or NPN bipolar transistors; the number of transistors can be any number other than four, depending on the circuit design. Therefore, all such substitutions and modifications are intended to be embraced within the scope of the invention as defined in the appended claims.

What is claimed is:

1. A controller for adaptively adjusting motor driving current waveforms, the controller supplying a PWM driving signal to a driver circuit, the controller comprising:
   a motor speed/period detection unit receiving a signal relating to a motor and detecting the speed and rotation period of the motor;
   a PWM signal advance/delay calculation unit receiving an output from the motor speed/period detection unit and a plurality of externally inputted parameters, the parameters including an advance time parameter for setting an advanced OFF time of the PWM driving signal, and determining the advanced OFF time of the PWM driving signal according to the advance time parameter and the speed of the motor, such that when the speed of the motor is slower, the advanced OFF time is relatively later, and when the speed of the motor is faster, the advanced OFF time is relatively earlier; and
   a PWM signal generation unit generating the PWM driving signal according to an output from the PWM signal advance/delay calculation unit,
   wherein the PWM signal advance/delay calculation unit is firmware.

2. The controller of claim 1, wherein the signal relating to a motor is a HALL signal.

3. The controller of claim 2, wherein the PWM driving signal is turned ON later than a level switching point of the HALL signal.

4. The controller of claim 3, wherein the PWM driving signal is turned OFF earlier than a next level switching point of the HALL signal.

5. The controller of claim 3, wherein a delay time of the turned-ON point of the PWM driving signal is determined by one of the parameters, the period of the HALL signal, and the maximum speed of the motor.

6. The controller of claim 4, wherein an advance time of the turned-OFF point of the PWM driving signal is determined by one of the parameters, the period of the HALL signal, and the maximum speed of the motor.

7. The controller of claim 1, wherein the PWM driving signal includes a plurality of PWM signals, and wherein the driver circuit includes a corresponding plurality of transistors, each of which has a gate controlled by a corresponding one of the PWM signals.

8. The controller of claim 7, wherein the PWM driving signal includes four PWM signals and the driver circuit includes four transistors electrically connected in series two by two in two pairs, the series connection node between each pair of transistors connected in series being electrically connected to an end of the motor, the other ends of the transistors which are not connected with the other transistor in the series connection pair being electrically connected to a supply voltage and ground, respectively; and wherein the four PWM signals control the gates of the four transistors such that in a time period, both of the transistors electrically connected to the supply voltage are OFF and both of the transistors electrically connected to ground are ON.

9. The controller of claim 1, wherein the parameters further include an ON parameter for setting a delay ON time of the PWM driving signal.

10. A method for adaptively adjusting motor driving current waveforms for use in a controller, the controller supplying a PWM driving signal to a driver circuit, the method comprising:

receiving a signal relating to a motor and detecting the speed and rotation period of the motor according to the signal;

receiving a plurality of parameters and the speed and rotation period of the motor, the parameters including an advance time parameter for setting an advanced OFF time of the PWM driving signal, and determining an advanced OFF time of the PWM driving signal according to the advance time parameter and the speed of the motor, such that when the speed of the motor is slower, the advanced OFF time is relativel later, and when the speed of the motor is faster, the advanced OFF time is relatively earlier; and generating the PWM driving signal.

11. The method of claim 10, wherein the signal relating to a motor is a HALL signal.

12. The method of claim 11, further comprising:
turning ON the PWM driving signal at a time point later than a level switching point of the HALL signal.

13. The method of claim 12, further comprising:
turning OFF the PWM driving signal at a time point earlier than a next level switching point of the HALL signal.

14. The method of claim 12, further comprising:
determining a delay time of the turned-ON point of the PWM driving signal by one of the parameters, the period of the HALL signal, and the maximum speed of the motor.

15. The method of claim 13, further comprising:
determining an advance time of the turned-OFF point of the PWM driving signal by one of the parameters, the period of the HALL signal, and the maximum speed of the motor.

16. The method of claim 10, wherein the PWM driving signal includes a plurality of PWM signals, and wherein the driver circuit includes a corresponding plurality of transistors, each of which has a gate controlled by a corresponding one of the PWM signals.

17. The method of claim 16, wherein the PWM driving signal includes four PWM signals and the driver circuit includes four transistors electrically connected in series two by two in two pairs, the series connection node between each pair of transistors connected in series being electrically connected to an end of the motor, the other ends of the transistors which are not connected with the other transistor in the series connection pair being electrically connected to a supply voltage and ground, respectively; and wherein the four PWM signals control the gates of the four transistors such that in a time period, both of the transistors electrically connected to the supply voltage are OFF and both of the transistors electrically connected to ground are ON.

18. The method of claim 10, wherein the parameters further include an ON time parameter for setting a delay ON time of the PWM driving signal.

* * * * *